(12) United States Patent
Colby et al.

(10) Patent No.: US 8,171,950 B2
(45) Date of Patent: *May 8, 2012

(54) COMPRESSED AIR REGULATOR APPARATUS SITUATED IN CANISTER AND METHOD FOR REGULATING COMPRESSED AIR THEREOF

(75) Inventors: Daniel Colby, Elk Grove, IL (US); Sam Newman, Redondo Beach, CA (US); Stanley Gabrel, Arlington Heights, IL (US)

(73) Assignee: YSN Imports, Inc., Gardena, CA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 12/115,481

(22) Filed: May 5, 2008

(65) Prior Publication Data

US 2009/0101215 A1    Apr. 23, 2009

Related U.S. Application Data

(63) Continuation-in-part of application No. 12/022,996, filed on Jan. 30, 2008, now Pat. No. 7,748,407.

(60) Provisional application No. 60/898,273, filed on Jan. 30, 2007.

(51) Int. Cl.
*F16L 35/00* (2006.01)

(52) U.S. Cl. ............ 137/15.01; 137/505.42; 137/614.2; 137/613; 222/3

(58) Field of Classification Search ............ 137/505.25, 137/505.42, 613, 15.18, 15.17, 15.19, 271, 137/269, 15.01; 222/3
See application file for complete search history.

(56) References Cited

U.S. PATENT DOCUMENTS

| | | | |
|---|---|---|---|
| 2,320,969 A | 6/1943 | Kromer et al. | |
| 2,529,275 A | 11/1950 | Blumer et al. | |
| 3,211,175 A | 10/1965 | Replogle | |
| 3,685,533 A * | 8/1972 | Krechel | 137/505.25 |
| 3,848,631 A * | 11/1974 | Fallon | 137/505.25 |
| 5,409,526 A | 4/1995 | Zheng et al. | |
| D357,967 S | 5/1995 | Colby | |
| 5,562,117 A | 10/1996 | Borland et al. | |
| 5,678,602 A | 10/1997 | Cannet et al. | |
| 6,089,027 A | 7/2000 | Wang et al. | |
| 6,343,476 B1 | 2/2002 | Wang et al. | |
| 6,360,546 B1 | 3/2002 | Wang et al. | |
| 6,363,964 B1 | 4/2002 | Carroll | |
| 6,405,722 B2 | 6/2002 | Colby | |
| 6,478,046 B2 | 11/2002 | Gabrel | |
| 6,543,475 B2 | 4/2003 | Colby | |
| 6,722,391 B2 | 4/2004 | Gabrel | |
| 6,851,447 B1 | 2/2005 | Carroll | |

(Continued)

*Primary Examiner* — Kevin Lee
(74) *Attorney, Agent, or Firm* — Bruce A. Jagger; Lance M. Pritikin

(57) ABSTRACT

A compressed gas regulator of a piston type is disclosed in which a regulator is configured with an input valve situated entirely inside a compressed air canister, which regulator is then attached to a paintball gun, marker or other device for providing discrete charges of gas at a predetermined pressure to the attached device. The overall size and weight of the regulator are minimized, which allows increased capabilities to the user. A regulator overpressurization port vents behind a conventional safety gauge for safety purposes. Fill, gage, and canister overpressurization rupture ports are interconnected with a fill channel that extends from the canister to the ports without intersecting or interfering with the regulating components within the regulator. The input valve seat face is surrounded by a shallow generally conical surface within an input plenum. The shallow generally conical surface extends at approximately 5 to 15 degrees.

21 Claims, 9 Drawing Sheets

U.S. PATENT DOCUMENTS

| | | |
|---|---|---|
| 6,907,740 B2 | 6/2005 | Tom |
| 6,959,724 B2 | 11/2005 | Heiderman |
| 7,004,192 B2 | 2/2006 | Gabrel |
| 7,080,655 B2 * | 7/2006 | Jacksier et al. .......... 137/505.25 |
| 7,178,551 B2 | 2/2007 | Wiederkehr et al. |
| 7,181,953 B1 * | 2/2007 | Street ....................... 137/505.25 |
| 7,188,640 B2 | 3/2007 | Gabrel |
| 7,309,113 B2 | 12/2007 | Carter |
| 7,481,241 B2 * | 1/2009 | Carpenter et al. ........ 137/505.25 |
| 7,748,407 B2 * | 7/2010 | Colby ...................... 137/505.42 |
| 2001/0054441 A1 | 12/2001 | Colby |
| 2004/0194835 A1 | 10/2004 | Gabrel |
| 2005/0045230 A1 | 3/2005 | Carroll |
| 2006/0249132 A1 | 11/2006 | Gabrel |
| 2008/0210210 A1 | 9/2008 | Colby |

* cited by examiner

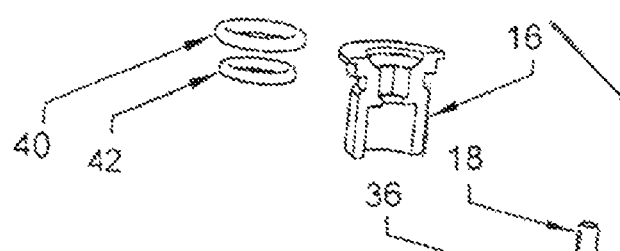
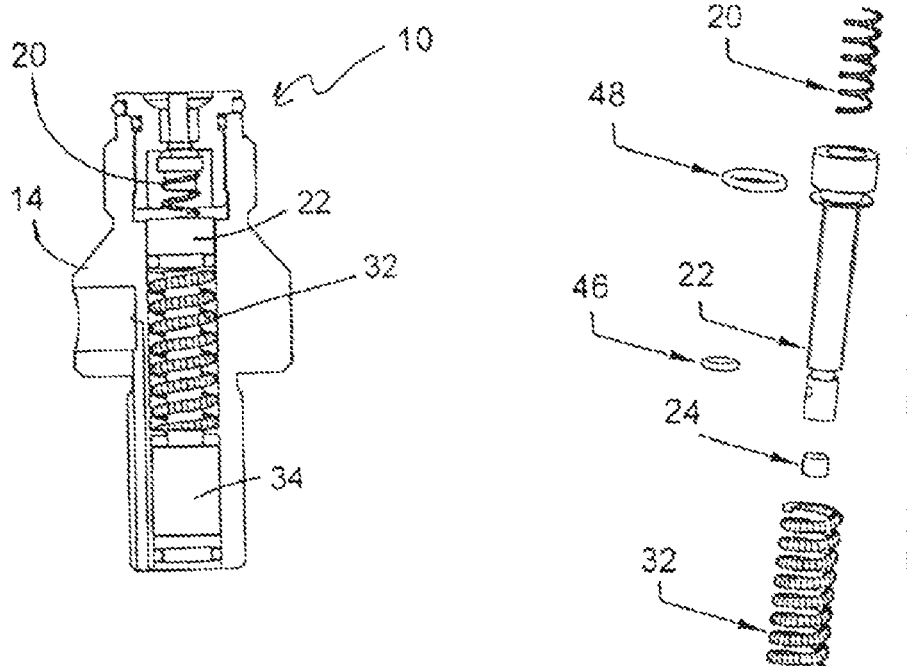
Fig. 4
Fig. 5

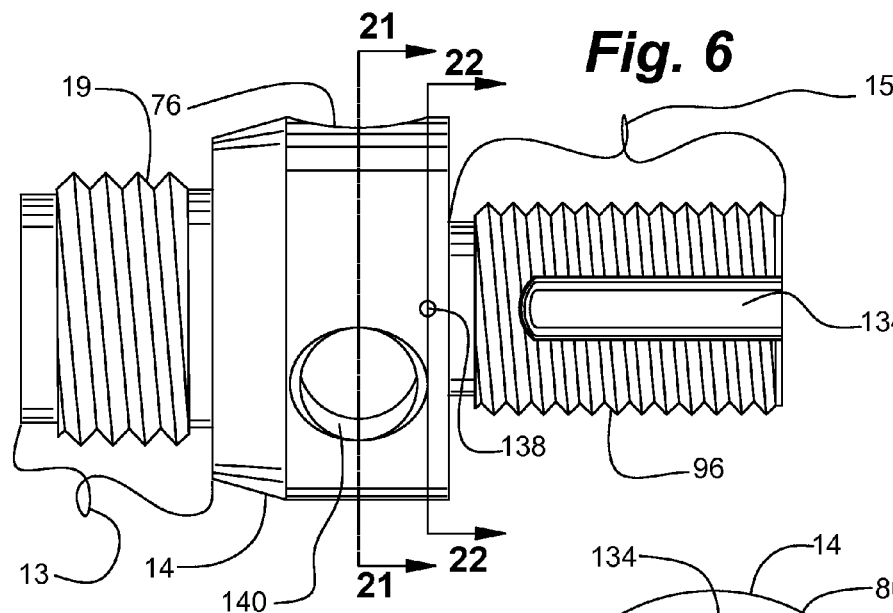
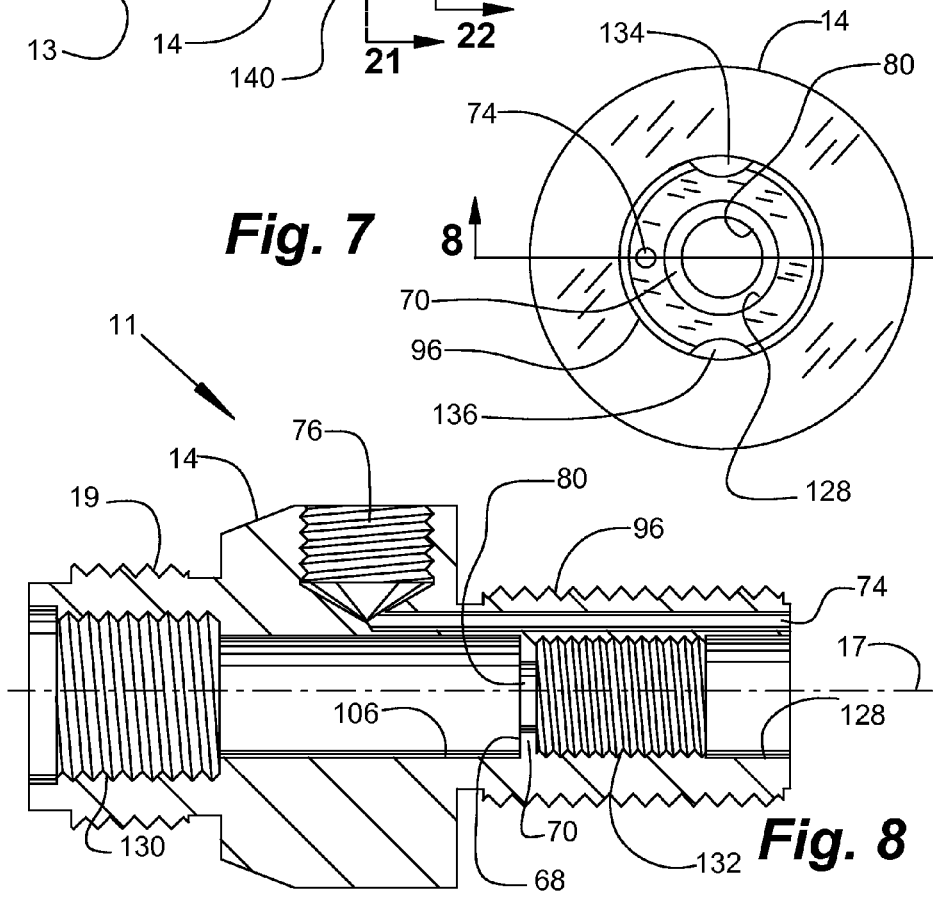

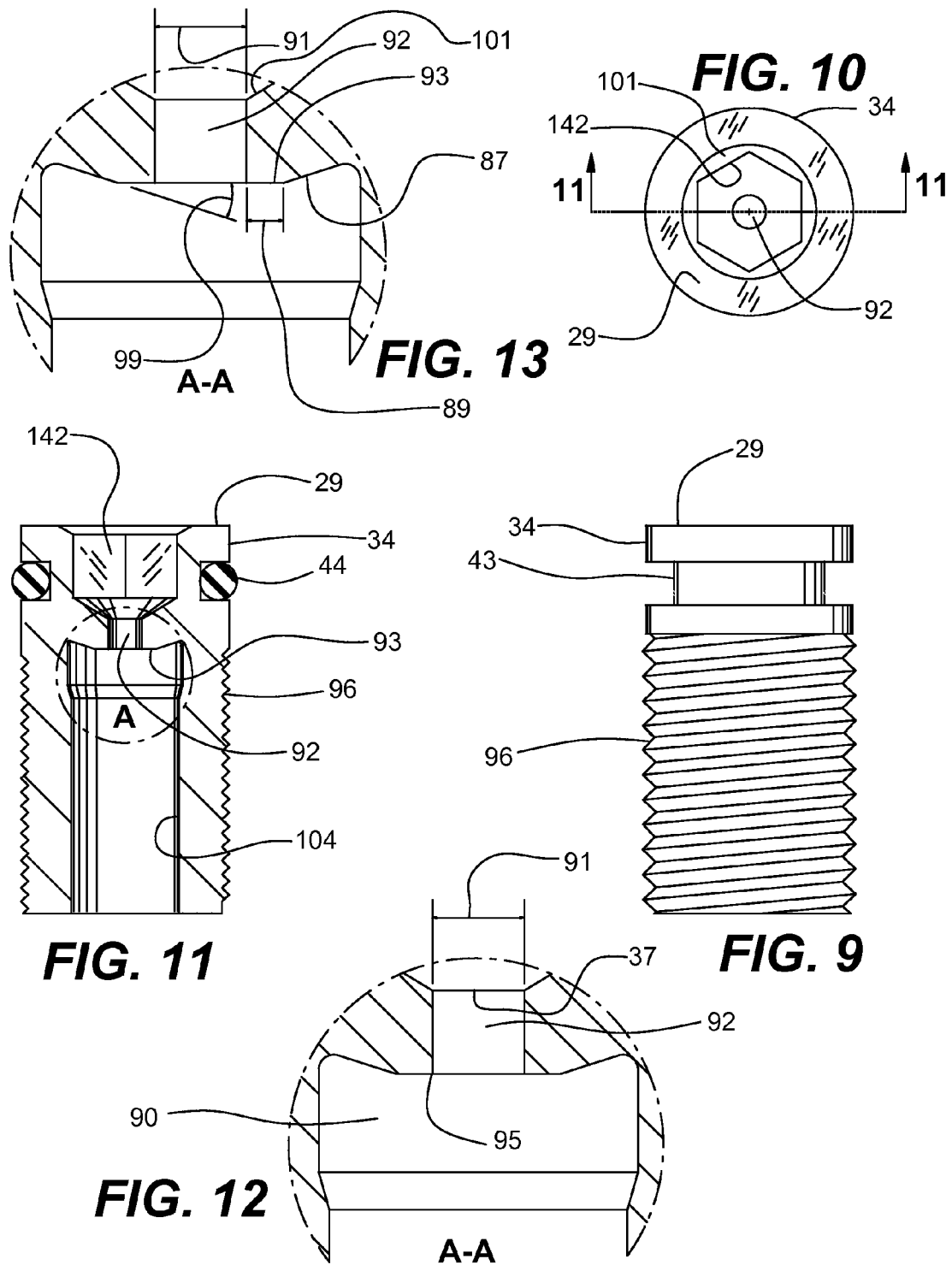

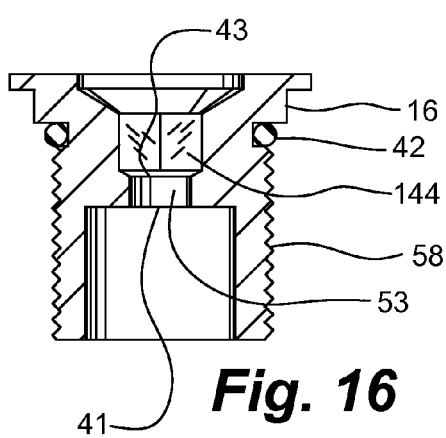
Fig. 16
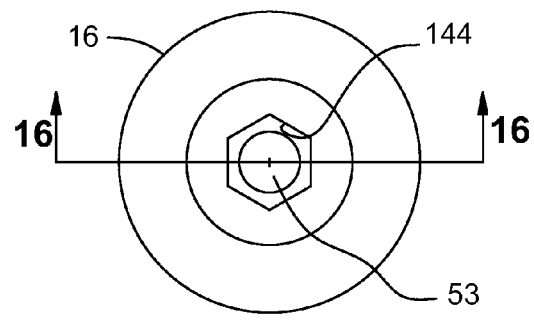
Fig. 15
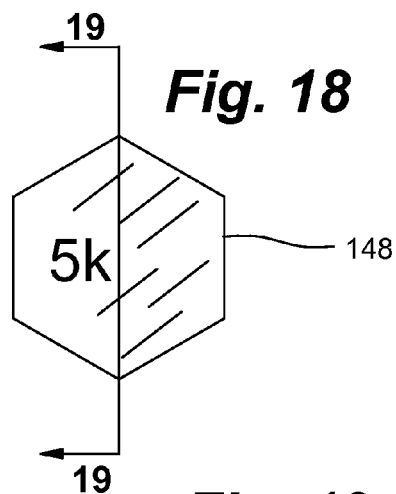
Fig. 18
Fig. 19
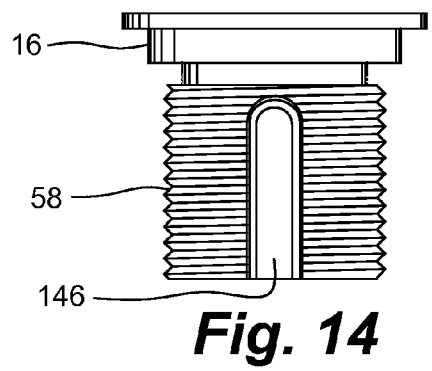
Fig. 14
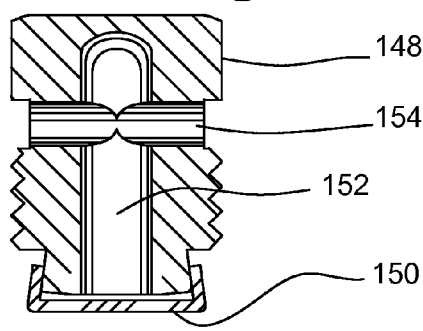
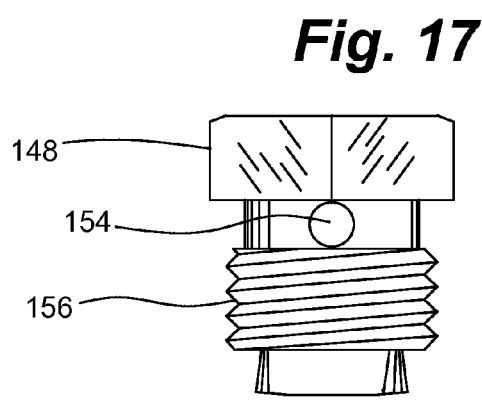
Fig. 17

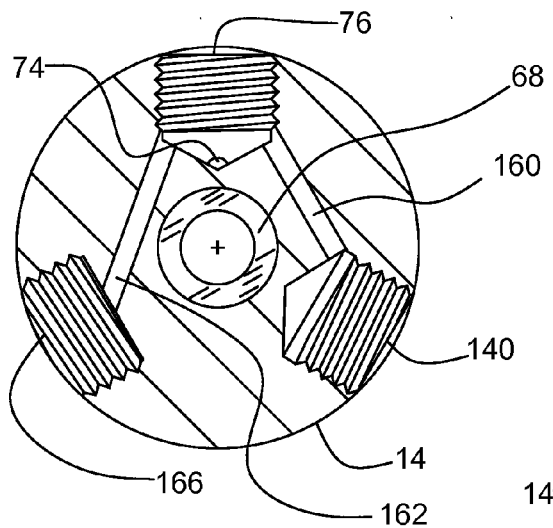
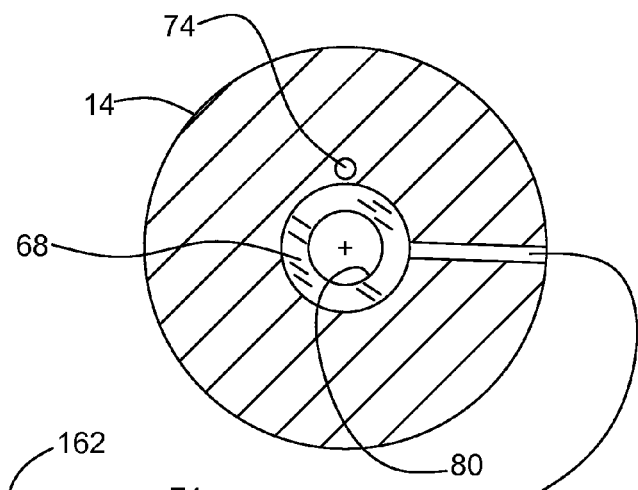
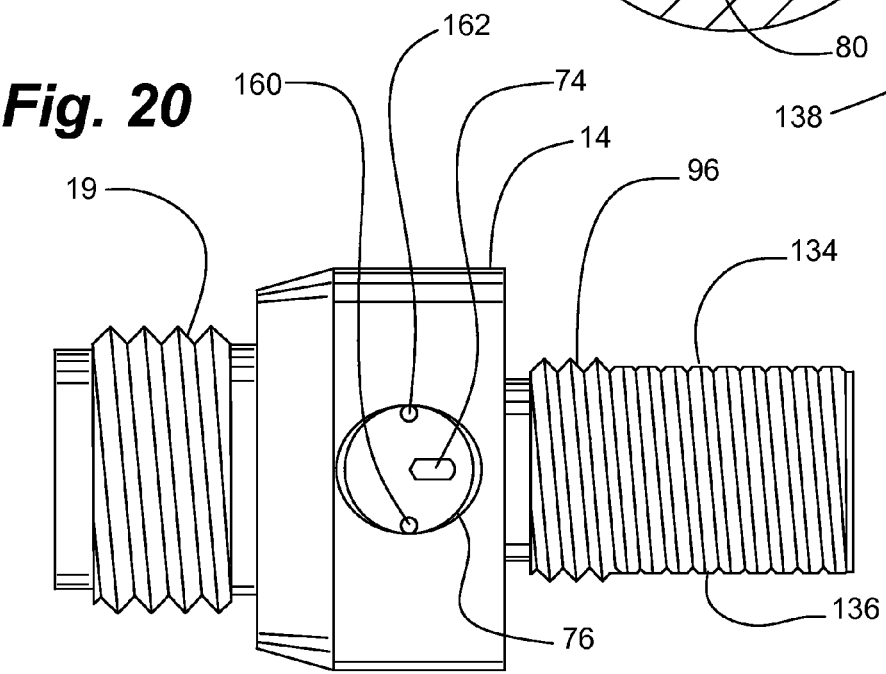

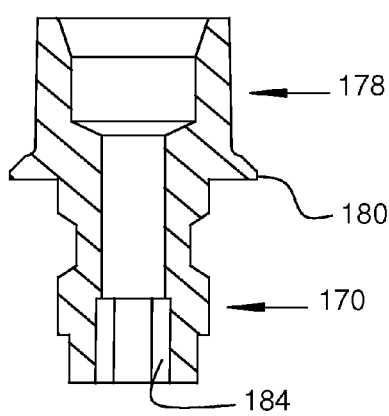
Fig. 24
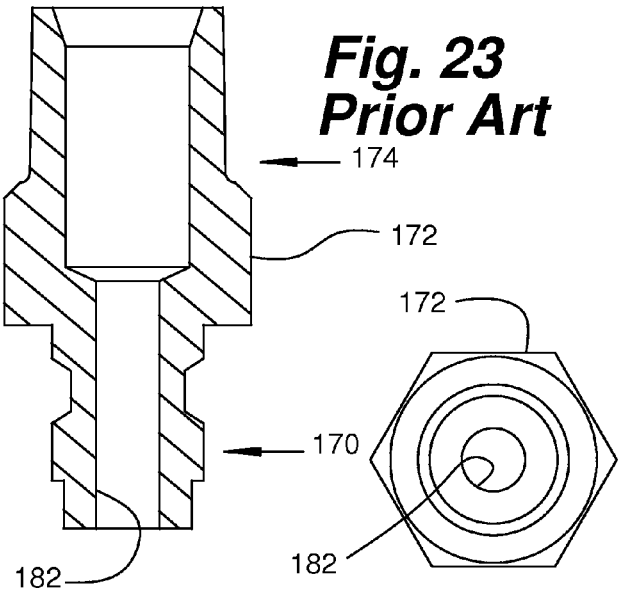
Fig. 23 Prior Art
Fig. 27 Prior Art
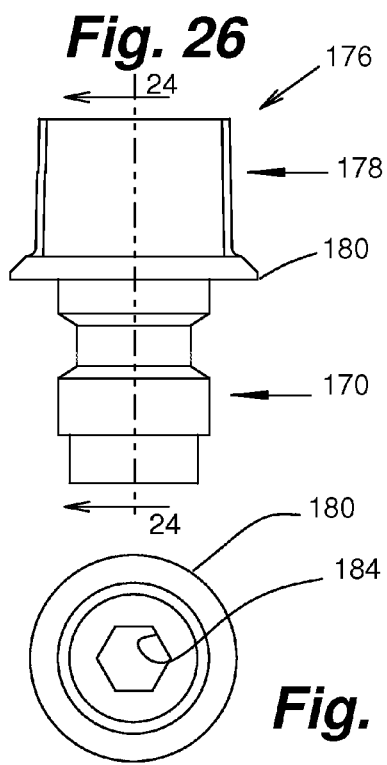
Fig. 26
Fig. 28
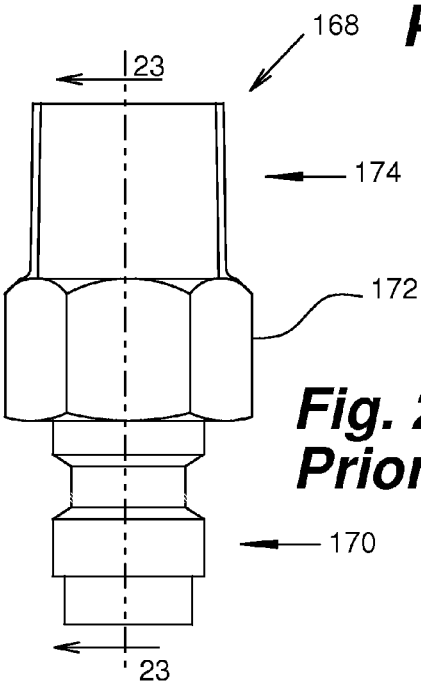
Fig. 25 Prior Art

COMPRESSED AIR REGULATOR APPARATUS SITUATED IN CANISTER AND METHOD FOR REGULATING COMPRESSED AIR THEREOF

RELATED APPLICATIONS

This application is a continuation-in-part of U.S. application Ser. No. 12/022,996, filed Jan. 30, 2008, now U.S. Pat. No. 7,748,407, which claims the benefit of U.S. Provisional Application No. 60/898,273, filed Jan. 30, 2007.

TECHNICAL FIELD OF THE INVENTION

The present invention relates generally to regulators for regulating gas, including air, that is delivered from a canister that contains compressed gas to a paintball gun, marker, or other devices that are activated by pressure controlled discrete charges of gas.

BACKGROUND OF THE INVENTION

Regulators that deliver discrete charges of pressure controlled gas are employed in a wide variety of industries where discrete charges of pressurized gas are used to, for example, activate controls, provide control, fire projectiles, provide feedstock, diluent, catalyst, carrier, or fuel to processes, or the like. These industries share in common a need for a regulator that reliably delivers accurately metered amounts of gas at a controlled pressure and at scheduled times or on demand. One such industry that requires such discrete charges is the paintball game industry.

The popularity of paintball games has grown immensely, and with that growth there has been a proliferation of different types of paintball guns (sometimes described as markers), and the devices that are used in conjunction with these markers, such as regulators and compressed gas canisters. Improvements in markers and related devices have become necessary due to the increased level of play as players improve and hone their skills. Improvements in paintball equipment encourages improvements in the players abilities and skills, which in turn requires further improvements in the equipment. The early types of markers and related devices provided an adequate level of play. However, the onset of more experienced players, along with challenging paintball gun tournaments, now provides an arena where better markers and peripherals are required to sufficiently compete.

As used herein "canister" includes all manner of pressure vessels, including, but not limited to small portable bottles or tanks, large stationary tanks, tanks connected to compressors, metallic containers, composite plastic containers, single or plural use pressure vessels, or other sources of compressed gas, and the like.

Safety is a serious concern with any system where pressurized gas is confined or handled in the equipment. Canisters typically confine gas under several thousand pounds of pressure (psi). Regulators that are in gas receiving communication with such canisters are sometimes exposed to the pressure that is in the canister. Regulators generally function to regulate the pressure that associated applications are exposed to. Often such associated applications are not capable of withstanding the gas pressure that is in the canisters. Unexpected spikes in gas pressure are sometimes encountered by such canisters and associated regulators. Regulators must be designed to reliably prevent excessive gas pressure from reaching the associated applications. Regulators are typically designed with sufficient strength to confine and regulate pressurized gas with a safety factor of at least twice the maximum anticipated pressure. This safety requirement dictates that the regulator be constructed with sufficient mass to provide the required strength. This makes the regulator heavier and larger than desired in many systems. Improvements are needed in this area, but without compromising safety.

In general, in paintball games a marker is used to fire or shoot a paintball at an intended target. A discrete charge of compressed gas is delivered from a canister through a regulator to a paintball marker to propel a paintball towards the intended target. The flow of gas from the canister to the marker is not continuous. The marker or paintball gun is attached directly or indirectly through a suitable conduit to a regulator, which is in turn attached to a source of compressed gas, such as a canister. The regulator meters the volume and controls the pressure of a charge of gas that is delivered to the marker. Typically, during the initial phases of operation the pressure in the canister is several times the output pressure from the regulator. For example, the pressure in the canister may be as much as 3,000 to 4,500 pounds per square inch (psi) or more, and the designed output pressure from the regulator in paintball systems may be approximately 800 psi, more or less. For other systems the output pressure may range from as little as approximately 5 or 10 psi to as much as approximately 1,000 psi or more. The regulator delivers gas to the marker at a predetermined maximum pressure one discrete charge at a time. The regulator accepts pressurized gas from a canister until the pressure within the regulator reaches a predetermined value and then shuts off the flow into the regulator. In paintball games the charge of gas is held in the regulator for an indefinite period of time until the player fires the marker. That is, the charge is available instantaneously for on demand use. For some applications charges are released at previously scheduled regular or irregular intervals. Releasing the charge immediately exhausts the charge from the regulator and delivers it to the marker or other application. The regulator then seals itself from outputting gas to the marker and opens its inlet to receive another charge of gas from the canister, and the cycle of fill, hold, and discharge starts over.

Cycle rates (the maximum number of complete fill-hold-discharge cycles per second) should generally be in the order of at least approximately 2 to 10 cycles per second. Reliable cycle rates in excess of this may be required or desired for other applications. Improvements are needed in the number of reliable cycles (cycle rates) exhibited by application-regulator-canister systems.

The overall marker-regulator-canister system in a paintball gun application is awkward and heavy to handle and carry when the components are large and heavy. Even a small reduction in size and/or weight is significant in increasing the usability and enjoyment of using the system. Also, any increase in the number of shots that may be reliably obtained from a given system without recharging the canister significantly improves the play of the user. There is a need for such improvements.

Many paintball guns operate on compressed gas such as air or nitrogen or other gasses or mixtures of gasses. The players typically carry a supply of compressed gas with them as they compete. This supply is depleted after a certain number of cycles. Typically, the players have no means of replenishing this supply of compressed gas without returning to some central station removed from the playing field. Compact lightweight systems that extend the number of cycles that are available from one canister full of gas are much sought after by players.

Typically, paintball gun and other systems operate by drawing charges of compressed gas from a closed canister. An inherent characteristic of such systems is that the pressure in the closed canister drops with each discharge. Even if a compressor is attached to a canister, the pressure in the canister fluctuates between compression cycles as the compressor starts and stops. If, for example, a canister initially held gas at a pressure of 3,000 psi, and a prior regulator was set to deliver charges of gas to an application at approximately 800 psi, such regulators generally ceased to operate or became erratic or unreliable in at least the recharging phase of their operating cycle as soon as the pressure in the canister dropped below approximately 800 psi. A player or operator then had to choose between attempting to continue play with a system that was at best unreliable, abandon the field of play or interrupt play to refill the canister. Such erratic behavior included slow recharging (not refilling the chamber in the regulator quickly enough), under filling (not filling to the maximum pressure available from the canister), flutter of the inlet valve, failing to operate at all, and the like.

A regulator should be able to recharge to the maximum pressure available from the canister several times a second to keep up with the pace of play demanded by competitive players or the demands of an operator in other industries. As the pressure in the canister drops below the pressure at which the regulator is set the performance of the system inherently degrades, but the degrading should follow a predictable curve. This enables a player to predict what the performance of the system will be for each shot even though the performance characteristics change from shot to shot. The ability to reliably utilize at least some part of the remaining gas in a canister when the canister pressure drops below that at which the regulator is set would provide substantial advantages in playing paintball games, and in other applications. The same concerns exist in other industries where discrete charges of gas are used. Where, for example, reactions, equipment or process controls are accomplished or activated by a predetermined charge of gas it is critical that the performance of the regulator be consistent and reliable. There is a clear and significant need for improvement in this area.

There are safety concerns with devices that operate on compressed gas. If the pressure in the canister exceeds the pressure rating for the canister, there must be an immediate relief of the pressure in the canister to avoid an explosion. Likewise, if the pressure within the regulator exceeds the pressure that the associated application or the regulator itself can safely accommodate, then there must be an immediate relief of the pressure in the regulator. The relief of the pressure in either the canister or the regulator should be accomplished in such a way that the operator is not exposed to any hazards. There is need for improvement in this area.

Any regulator in a marker-regulator-canister system that safely provides a reduced size and weight advantage and extends the period of play or other use while remaining reliable and consistent would be uniquely advantageous. As such, there is a great need in the field of paintball systems and other systems for such regulators.

Examples of regulators for regulating pressurized gas that is delivered from a canister to a paintball gun or a marker are illustrated in Colby U.S. Pat. No. Des. 357,967, Colby U.S. Pat. No. 6,543,475, Colby U.S. Pat. No. 6,405,722, Carroll U.S. Pat. No. 6,851,447, Carroll U.S. Pat. No. 6,363,964, Gabrel U.S. Pat. No. 7,004,192, Gabrel U.S. Pat. No. 7,188,640, Gabrel U.S. Pat. No. 6,722,391, and Gabrel U.S. Pat. No. 6,478,046, each of which is hereby incorporated by reference as if fully set forth herein. Colby U.S. Pat. No. 6,405,722 discloses a piston type regulator wherein pressurized gas is injected through the body of the housing to recharge an attached pressure vessel. The pressurized gas flows past part of the regulator mechanism through the same channel that gas is discharged from the attached pressure vessel to the regulator. Gabrel U.S. Pat. No. 7,004,192, and these other Gabrel patents are similar in design to the Colby U.S. Pat. No. 6,405,722 piston type regulator except that Gabrel provides an on-off valve in the discharge channel that may be closed during filling of the attached pressure vessel to protect the regulating mechanism from the high pressure gas flow. A separate fill passageway runs into the pressure vessel through a side wall of the coupling that attaches to the pressure vessel.

Accordingly, there exists a need for a regulator for compressed gas that is safe, light-weight, compact, reliable, and that exhibits predictable charge-hold-discharge cycle characteristics, particularly when operated at canister pressures below the maximum pressure at which the regulator is set to deliver discrete charges. There is a need for the combination of these features in one regulator.

SUMMARY OF THE INVENTION

In embodiments, a regulator is provided that is reduced in size, complexity, and weight, and provides improvements in safety, reliability, and functionality. Some embodiments provide improved functionality, particularly when the pressure within the canister is below the pressure at which the regulator is set to deliver gas charges to an attached device. In some embodiments, improvements are achieved by reducing the number and complexity of the housing and operating components, which improves reliability and reduces cost. In some embodiments, fewer machining operations are required to manufacture the housing, thus reducing costs and improving quality.

In embodiments that are particularly suited for use, among other uses, in a marker-regulator-canister system, some of the operating components within the regulator housing are located in a portion of the regulator's housing that is normally inserted into at least the neck of the canister. This, for example, reduces the mass of the regulator housing, the length of the housing that projects from the canister, and the overall size of the system.

According to current practice in the paintball industry, a regulator screws into an (ASA) or other adapter which, in turn, attaches to the marker. Other connections in the paintball and other industries are contemplated, including, for example, quick disconnect couplings, hoses with appropriate connectors between the canister and the regulator, or between the regulator and the marker, and the like. Any type of connection will suffice so long as it safely holds gas pressure and allows for activation of the marker without interference with the operation of the marker-regulator-canister system. In some embodiments, the regulator is connected by a hose to the marker.

According to some embodiments, a canister provides an unregulated primary source of pressurized gas. A gas regulator is provided to regulate the delivery of gas charges to a marker or other device. In embodiments, the regulator may be preset to deliver discrete charges of gas to the attached marker at a particular volume, pressure, and cycle rate over a wide range of gas pressures in an attached canister.

In some embodiments, the regulator may be configured to address safety concerns. An attempt to separate the components of the system while there is pressure in the system may result in injury to the operator. This problem may be solved by, for example, configuring the regulator so that pressure is automatically released before the components can be fully separated. The release of pressure alerts the operator to the presence of pressurized gas in the system. If the operator ignores this warning sign, the configuration is such that the gas pressure will be fully reduced to ambient pressure before the components can be separated. In some embodiments, the seal configurations are such that if for some reason the pressure within the regulator exceeds the pressure at which the attached device may safely receive a charge of gas, the gas will break through the seals in the regulator and vent from inside the regulator through a pressure relief channel to an ambient atmosphere until the pressure falls to a safe level. In some embodiments, if the canister is over pressurized, for example, during filing, a rupture disk is provided in the regulator to immediately vent the pressure in the canister to an ambient atmosphere.

Embodiments find utility in many systems. Such systems where regulated charges of gas are utilized include, for example, propellant regulators for gas actuated guns, in military unclassified and classified use, in sea, land, and air vehicle servo systems, in medical procedural and exploratory manipulations, in fuel cells, and in industrial robotic and automated applications. Embodiments find utility in, for example, multi-step pressure reduction systems where embodiments provide one of the steps in reducing pressures from very high levels, for example, 8,000 to 10,000 psi.

Certain embodiments are comprised of a regulator for regulating the delivery of pressurized gas from a supply of pressurized gas to a device that utilizes discrete charges of pressure regulated gas. Some embodiments include a regulator housing, that has proximal and distal ends, a specially configured bore extending therethrough, a proximal portion adjacent the proximal end, a distal portion adjacent the distal end, and a body portion extending between the proximal and distal portions. The proximal portion is adapted to being gas receivingly connected to a supply of gas, and the distal portion is adapted to being gas dischargingly connected to the device that utilizes discrete charges of pressure regulated gas. In certain embodiments an input valve seat member is removeably mounted substantially entirely within the proximal portion. The valve seat member includes a metering orifice extending therethrough from an inlet to an outlet. An input valve seat generally surrounds the outlet and generally faces towards the distal end. A piston receiving bore extends from generally adjacent the input valve seat member generally toward the distal end. An output valve seat member is removeably mounted generally in the distal portion. The output valve seat member has an outlet orifice extending therethrough between a first end and a second end. The second end opens to the distal end. An output valve seat generally surrounds the first end and generally faces toward the proximal end. A poppet member is mounted for movement in the outlet orifice between open and closed configurations. The poppet member is adapted to sealingly engage the output valve seat in the closed configuration. A piston member is mounted in sealing engagement with the piston receiving bore. The piston member is adapted to move between gas input, holding, and output configurations and to sealingly engage the input valve seat in the gas holding configuration The piston member is resiliently biased by a spring member toward the gas input configuration The piston member sealingly defines pressurized and un-pressurized chambers within the regulator. The un-pressurized chamber generally surrounds a portion of the piston member, and is open to an ambient atmospheric pressure. The pressurized chamber extends generally from the input valve seat to the output valve seat. A first surface portion of the piston member generally faces the proximal end and a second surface portion of the piston member generally faces the distal end. The first surface portion has a larger surface area than the second surface portion.

Both the first and second surface portions are within the pressurized chamber. The larger surface area is adapted to allowing gas pressure within the pressurized chamber to overcome the resilient bias of the spring member and move the piston member to sealingly engage the input valve seat.

Some embodiments include a fill port in the body portion, and a fill channel extending in the regulator housing from the proximal end into the fill port without intersecting the specially configured bore.

In certain embodiments, the body portion includes a fill port, a pressure gauge port, and a rupture disk port, a fill channel extending from the proximal end into the body portion through the proximal portion outwardly of the specially configured bore and into the fill port. The fill channel is connected to the pressure gauge port through a pressure gauge channel and to the rupture disk port through a rupture disk channel.

Some embodiments include a pressure gauge port and a pressure relief channel open to an ambient atmosphere and extending between the un-pressurized chamber and an exterior portion of the body portion. The exterior portion is adjacent the pressure gauge port.

According to certain embodiments, the metering orifice is generally cylindrical and the input valve seat comprises generally a frustum of a right cone generally concentric with the metering orifice. The input valve seat includes a seat portion around the outlet.

In some embodiments the proximal portion bears a male thread and the input valve seat member is entirely within the proximal portion.

In an embodiment, the regulator housing is all one piece, and there is an axis extending longitudinally of the regulator housing between the proximal and distal ends. The specially configured bore extends generally concentrically of the axis. The specially configured bore includes a first female thread adapted to threadably engage the input valve seat member, a second female thread adapted to threadably engage the output valve seat member. The specially configured bore also includes a smooth bore generally in the body portion and adapted to sealingly engage the piston member. The specially configured bore further includes an annular boss extending inwardly from the smooth bore. The spring member is supported in resiliently biased relation to the piston member by the annular boss.

In certain embodiments, the pressure regulating components within the valve housing include generally in axial alignment within a specially configured bore, an input valve seat member, a piston member, a poppet member, and an output valve seat member. The piston member is surrounded by a spring member within an un-pressurized chamber.

The input valve seat member is comprised of a metering orifice and an input valve seat positioned to be engaged by a resilient seal carried on the proximal end facing end of the piston member. The spring member resiliently biases the piston member out of engagement with the input valve seat into an input configuration. This is the default un-pressured configuration. When the pressure on the distally facing surfaces of the piston member reaches the pressure at which the regulator is set, this pressure overcomes the combined spring bias and gas pressure on the proximally facing surfaces of the piston member. The piston member then slides axially of the specially configured bore into sealing engagement with the input valve seat. This is the holding configuration, which exists until the pressure is released from the pressurized chamber by moving the poppet member to an open configuration. The Poppet member is moved to the open configuration by some element that is generally external to the regulator. Typically, this external element is a poppet actuator that forces the poppet member into the regulator housing far enough to release the poppet member from sealing engagement with the output valve seat on the output valve seat member. Generally, the poppet member is resiliently biased by a poppet spring toward engagement with the output seat member, and the poppet actuator releases the poppet member as soon as the charge is emitted from the regulator. This release is generally substantially instantaneous so that the release and resealing of the poppet member is substantially simultaneous with the release of the seal element on the proximally facing end of the piston member from the input valve seal. Refilling of the pressurized chamber with pressurized gas thus generally occurs within a fraction of a second after a charge is expelled from the regulator. Once the pressure builds up in the pressurized chamber it forces the piston member from the open configuration to the holding configuration, and the cycle is complete.

The tension in the spring member that biases the piston member generally determines the operating pressure (output pressure) of the regulator. In general, the greater the spring tension, the higher the operating pressure, because it takes more pressure to overcome the spring tension as the spring tension increases. The spring tension may be selected to produce a charge pressure of from approximately 10 psi to 1,000 or more psi, depending on the requirements of a particular associated device.

The piston member requires enough surface area on the distally facing surfaces so the gas pressure on those surfaces will overcome the opposing forces (spring tension and gas pressure on the proximal end of the piston member) when the desired pressure within the regulator has been achieved. This generally requires that the piston be larger on the distally facing end than it is on the proximally facing end.

The configuration of the input valve seat has a substantial influence on the performance characteristics of the regulator. It has been found that embodiments of the present invention require a plenum region around the inlet valve seat, and that the input valve seat should have a generally shallow conical form. Steep conical forms at this seat location tend to produce valve flutter at lower tank pressures.

Embodiments of the regulator continued to reliably produce discrete charges of pressurized gas even after the pressure in the gas supply dropped below the nominal output pressure for which the regulators were designed. If, for example, the tension in the piston spring was set to produce discrete charges of gas pressurized at 800 psi, but the pressure in the attached canister dropped to 500 psi, embodiments of the regulator continued to reliably produced discrete charges of pressurized gas. The pressure of the charges did not exceed the canister pressure. As the supply gas pressure continued to fall with each charge that was drawn from the canister, eventually the inlet valve fluttered and the regulator no longer functioned. The pressures at which regulators failed to function were as low as one-third or even one-quarter of the nominal output pressure for which the regulator was designed.

For reasons of availability, convenience and expense air is typically the preferred gas, but other gasses such as carbon dioxide, nitrogen, mixtures of various gasses, and the like may be used, if desired. Where the gas is a feedstock, carrier, or catalyst for a process, the gas that is necessary for the desired reaction is used.

Embodiments of the regulator are designed such that a portion of the regulator is located inside the canister thereby reducing the size of the marker set up used when the regulator and canister are attached to the marker. In general, at least the inlet valve components and a portion of the piston strut are positioned within the portion of the regulator that normally extends into the canister. This shortens the profile of the regulator and materially improves a user's ability to carry and manipulate a system that contains embodiments of this regulator. For other types of installation, the low profile allows embodiments to be used in many locations where space for a regulator with a larger profile is not readily available. Existing conventional canisters can be used with embodiments of the regulator. However, modified canisters may be used with embodiments of the regulator to take full advantage of the features of embodiments of the regulator.

Embodiments of the regulator may be constructed of various materials, including, aluminum alloys, engineering plastics, stainless steel, or the like. The materials will be selected by those skilled in the art of regulators depending on such factors as the intended operating environment (corrosive, abrasive, impact, or the like), anticipated operating pressures and temperatures, and the like, as a specific application may dictate.

The size and weight advantages of embodiments of the regulator are further enhanced by selecting tolerances and components such that excess pressure within the regulating components (pressurized chamber) is relieved by blowing past the seals to atmospheric pressure (un-pressurized chamber). A separate burst disk assembly for reliving excess pressure within the regulator is not needed. The un-pressurized chamber vents to the ambient atmosphere through a vent port in the regulator housing that is adjacent to the pressure gage port. The pressure gage displays the pressure in the canister, not that in the pressurized chamber within the regulator. The pressure gage is of such a size that it shadows the outlet end of the vent port from a user. The escaping gas impinges on the pressure gage and is dissipated without being directed full force onto the face or hands of a user.

The detailed description of embodiments of the regulator is intended to serve merely as examples, and is in no way intended to limit the scope of the appended claims to these described embodiments. Accordingly, modifications to the embodiments described are possible, and it should be clearly understood that the invention may be practiced in many different ways than the embodiments specifically described below, and still remain within the scope of the claims.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 4 is partially cutaway schematic depicting coiled compression springs operatively positioned in an embodiment of a regulator;

FIG. 5 depicts an exploded schematic of an embodiment of a regulator;

FIG. 6 depicts a side view of an embodiment of a regulator housing;

FIG. 7 depicts an end view of the embodiment of FIG. 6;

FIG. 8 depicts a cross-sectional view taken along line 8-8 in FIG. 7;

FIG. 9 depicts a side view of an embodiment of an input valve seat member;

FIG. 10 depicts an end view of the embodiment of FIG. 9;

FIG. 11 depicts a cross-sectional view taken along line 11-11 in FIG. 10;

FIG. 12 depicts an enlarged broken view of section A in FIG. 11;

FIG. 13 depicts an additional enlarged broken view of section A in FIG. 11;

FIG. 14 depicts a side view of an embodiment of a output valve seat member;

FIG. 15 depicts an end view of the embodiment of FIG. 14;

FIG. 16 depicts a cross-sectional view taken along line 16-16 in FIG. 15;

FIG. 17 depicts a side view of an embodiment of a rupturable safety disk member;

FIG. 18 depicts an end view of the embodiment of FIG. 17;

FIG. 19 depicts a cross-sectional view taken along line 19-19 in FIG. 18;

FIG. 20 depicts a side view of an embodiment of a regulator housing;

FIG. 21 depicts a cross-sectional view taken along line 21-21 in FIG. 6; and

FIG. 22 depicts a cross-sectional view taken along line 22-22 in FIG. 6.

FIG. 23 depicts a cross-sectional view of a prior art pneumatic fill nipple taken along line 23-23 in FIG. 25.

FIG. 24 depicts a cross-sectional view of an embodiment of a pneumatic fill nipple with a shortened profile taken along line 24-24 in FIG. 26.

FIG. 25 depicts a side view of a prior art pneumatic fill nipple.

FIG. 26 depicts a side view of an embodiment of a pneumatic fill nipple with a shortened profile.

FIG. 27 depicts an end view of a prior art pneumatic fill nipple.

FIG. 28 depicts an end view of an embodiment of a pneumatic fill nipple with a shortened profile.

Figure 1:
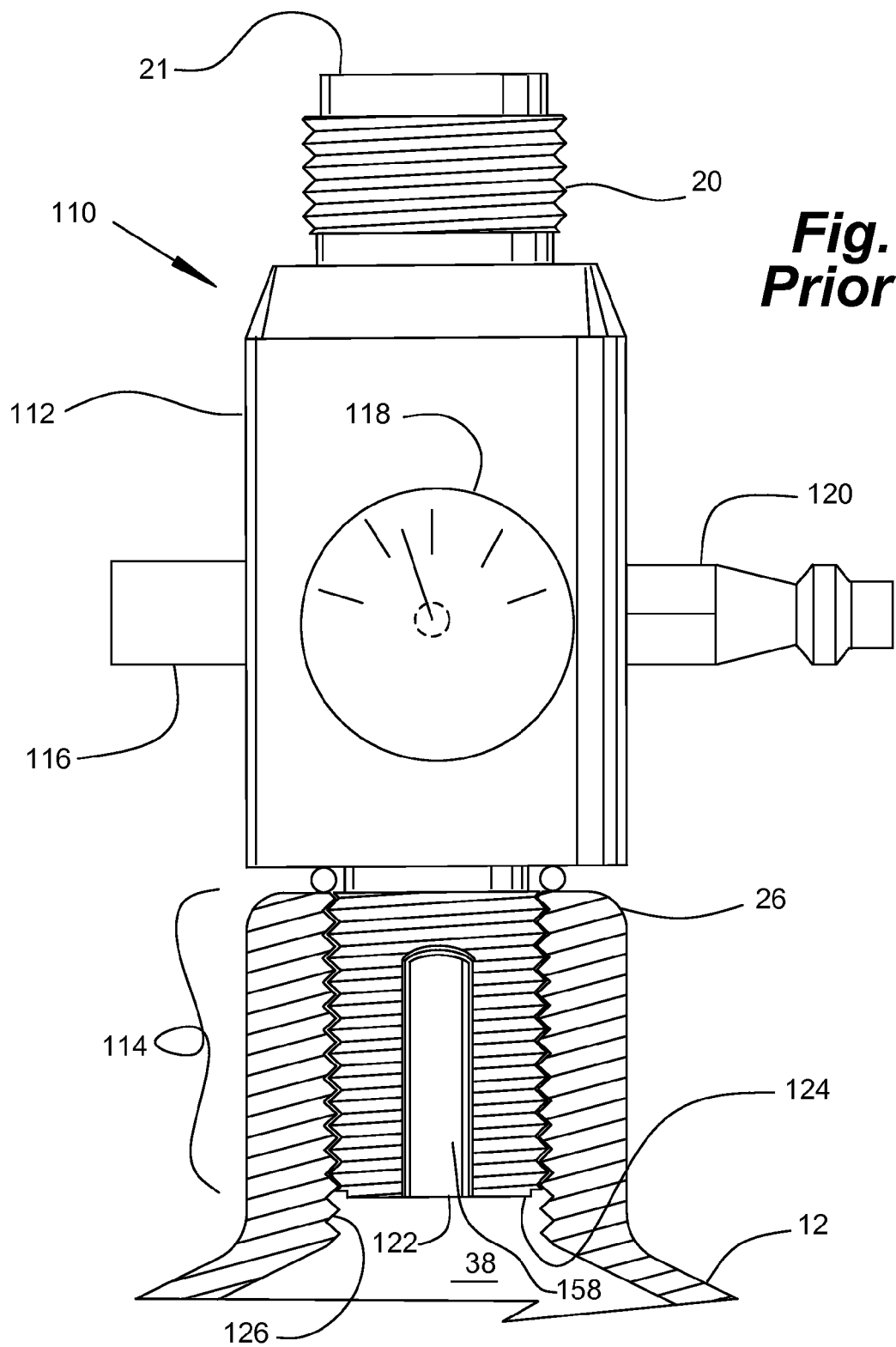
FIG. 1 is a view depicting a prior regulator situated in a compressed air canister with the canister shown cutaway.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE INVENTION

The following description of preferred embodiments generally relates to regulators for regulating the delivery of discrete charges of gas at predetermined pressures in systems that utilize such pressure regulated gas charges. Certain embodiments of the present invention comprise regulators for compressed gas that exhibit short profiles, are compact, light weight, simple, reliable, and capable of reliably delivering discrete charges even at pressures below that at which the regulator is set to operate. In some embodiments, when a regulator is mounted to a canister of compressed gas, part of the regulator's gas regulating mechanism is located within a proximal portion of the regulator's housing that is positioned inside of at least the neck of canister. Thus, the length of the portion of the regulator that normally projects out of the neck of the canister is shortened by at least the length that is required to accommodate the part of the regulator's gas regulation mechanism that is normally positioned within the canister. Where embodiments of the regulator are used in systems that position the regulator outside of the canister, the advantages of reduced bulk and weight are still realized. Certain embodiments of the regulator are adapted to being attached to a marker or paintball gun (not shown) to regulate the flow of compressed gas to the marker.

FIG. 1 depicts a prior art regulator 110 installed on a conventional canister 26 with the canister neck 114 shown in a cutaway view. This illustrates how the proximal end of a prior art regulator 110 is threadably inserted into the neck portion 114 of a canister 26. As is known to one having ordinary skill in the art, the regulator 110 is threadably inserted into the canister 26 by screwing the male thread of the regulator 110 into the female thread 126 of the canister 26. The marker (not shown) is then threadably attached to the male thread 20 at distal end 21 of the prior art regulator 110. Pressurized gas is confined within the closed interior 38 of canister 26, and flows into regulator 110 through a generally axially centered inlet port indicated at 122 in the proximal end 124 of regulator 110. The wall 12 of the canister 26 is configured to confine a volume of pressurized gas within closed interior 38 until it is delivered to regulator 110. Wall 12 may include a fill valve and a safety valve, if desired. The body or housing 112 contains the pressure and cycle regulating components in operative association with one another. A conventional gas pressure gage 118, a conventional filling attachment 120, and a conventional safety pressure release member 116 are mounted to housing 112 in operative communication with the interior of housing 112. A groove 158 extends generally axially of the regulator 110 from proximal end 124 axially through the male threads on the regulator for approximately two-thirds of the axial length of the male threads. This is a safety feature. If the regulator is unthreaded from the canister while there is pressure within the canister, substantially all of the pressurized gas will vent through groove 158 before the regulator can be completely unthreaded from the canister. Also, the presence of escaping gas will alert the operator that there is still gas under pressure within the canister.

Figure 2:
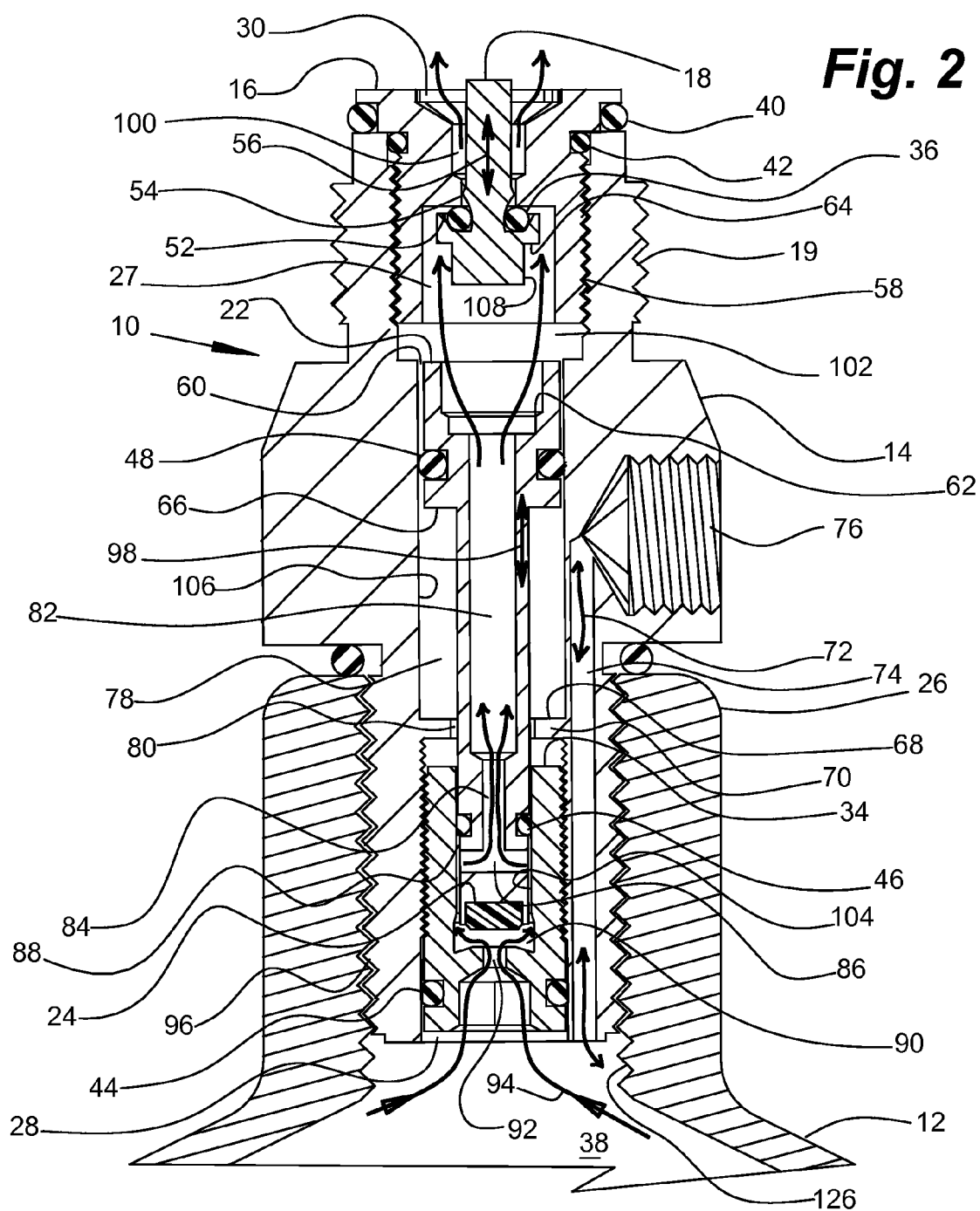
FIG. 2 is a cross-sectional view depicting an embodiment of a regulator situated in a canister from which the coiled compression springs have been eliminated for clarity of illustration.
Figure 3:
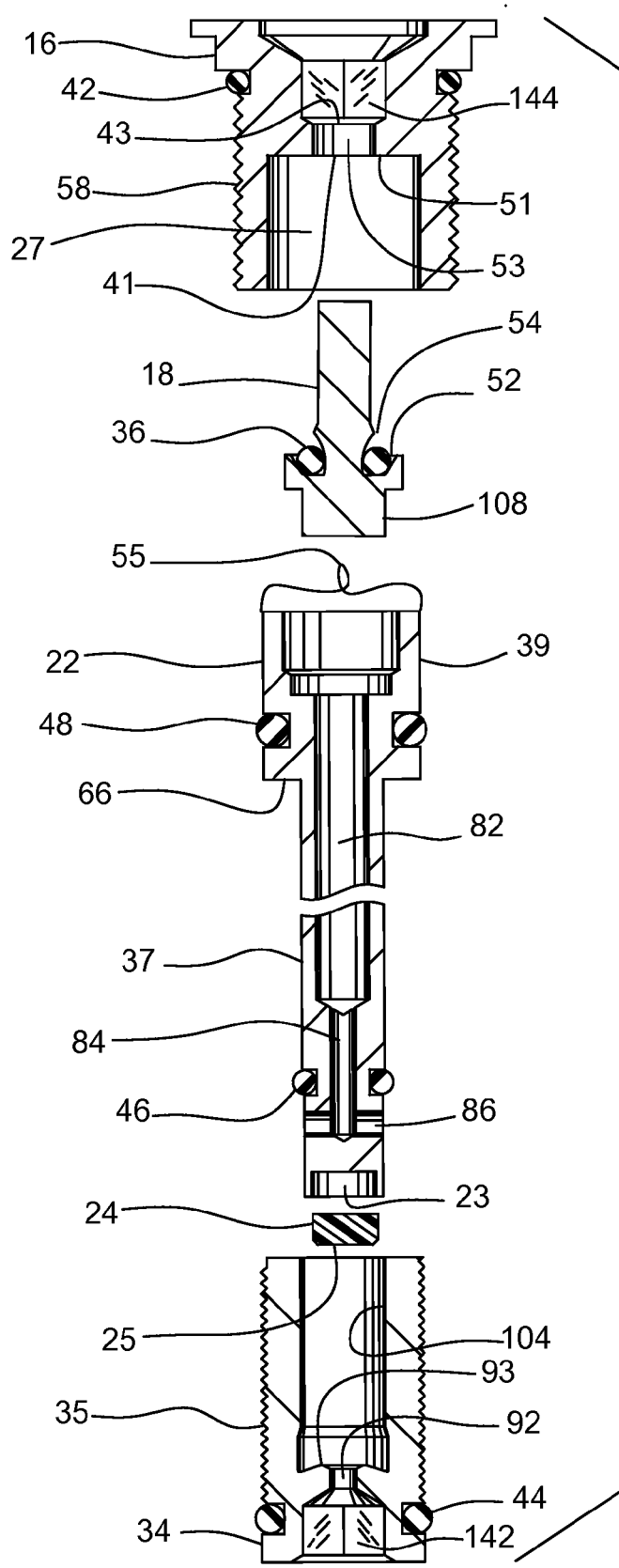
FIG. 3 is an exploded cross-sectional view depicting the individual pressure regulating components (except for the coiled compression springs) of the embodiment of FIG. 2.

FIG. 2 indicates generally at 10 an embodiment of a regulator chosen for purposes of illustration. In the depicted embodiment a regulator is shown inserted inside a cutaway of a conventional canister 26. The regulator components of regulator 10 are shown in assembled configuration within regulator housing 11 between proximal end 28 and distal end 30. Regulator housing 11, without the regulator components, is shown in cross-section in FIG. 8. An exploded cross-sectional view of the regulator components without the spring elements is shown in FIG. 3. FIG. 4 diagrammatically depicts an assembled embodiment in a view similar to FIG. 2, and FIG. 5 diagrammatically depicts an exploded view similar to FIG. 3. The piston spring 32 and the poppet spring 20 are illustrated in FIGS. 4 and 5. The canister 26 contains a closed interior 38, defined by wall 12, wherein compressed gas is located. In use, the regulator 10 is adapted to being attached to devices that require discrete pulses of pressure regulated gas for their operation. Such devices include, for example, markers or paintball guns, command and control mechanisms, reactors, and the like, (not shown). Regulator 10 is connected to such devices by, for example, screwing the male threads 19 into female threads that are associated with the devices directly or through suitable conduits. For example, when the device is a marker or paintball gun, the male threads 19 are, for example, screwed into an ASA adapter (not shown), which in turn is attached to the marker. In such embodiments, the compressed gas confined within the closed interior 38 of the canister 12 can be directed to the marker through the regulator 10, which regulates the pressure of the discrete pulses or charges of compressed gas that are provided to an attached device.

Some embodiments of the regulator may accept input pressures up to, for example, approximately 5,000 psi, and can be configured to regulate an output pressure range of between approximately 1 to 5,000 psi. Embodiments are sometimes configured to have a nominal outlet pressure of, for example, approximately 700-950 psi. As the pressure in such embodiment's sources of pressure drops below the nominal outlet pressure, the pressure of the discrete charges or pulses emitted by such embodiments likewise drops below the predetermined nominal output pressure. If the pressure in the attached canister is, for example, 500 psi, the pressure of the emitted charges will not exceed 500 psi.

FIG. 3 depicts an exploded view of an embodiment of the gas regulating components within regulator housing 11 (FIG. 8). The coiled springs 20 and 32 (see FIGS. 4 and 5) are not shown so that the other components may be more clearly depicted. O-ring seals 42, and 44 (see FIGS. 2 and 3) serve to seal the interior (specially configured bore) of the regulator housing 11. O-ring seal 36 in retainer groove 52 in poppet member 18 valvingly seals outlet orifice 53, and sealing disk 24 in seal pocket 23 serves to valvingly seal metering orifice 92 of regulator 10. O-ring seals 46 and 48 serve to seal a pressurized chamber (sub-chambers 90, 88, 82, 102, 84, and 86) from an un-pressurized chamber 78 (see FIG. 2). Chamber 78 is open to ambient pressure by reason of vent port 138 (see FIGS. 6 and 22).

FIG. 4 depicts a diagrammatic partially cutaway view of an embodiment showing, inter alia, how the springs 20 and 32 fit with the other regulating components in a fully assembled configuration.

FIG. 5 depicts a diagrammatic exploded partially cutaway view of an embodiment showing, inter alia, the regulator components, including the springs 20 and 32, and the regulator housing.

Piston spring 32 (FIGS. 4 and 5) urges piston member 22 towards a position in which metering orifice 92 is open to receive pressurized gas from canister 26. The amount of tension in piston spring 32 determines the amount of gas pressure in the pressurized chamber that will cause seal 24 to valvingly seal the metering orifice 92. When pressurized gas is allowed to flow through metering orifice 92, and outlet orifice 53 is closed, pressure very quickly builds up in the pressurized chamber. The gas pressure on a second surface portion 55 of piston member 22 exceeds that on a first surface portion 25 of sealing disk 24. This gas pressure tends to urge the piston axially towards sealingly engaging first surface portion 25 with an input valve seat (elements 87, 89, 93, and 95, see FIGS. 11-13) that surrounds metering orifice 92. When the difference between these pressures exceeds the tension in piston spring 32 (see FIGS. 4 and 5), the piston member 22 slides axially to bring first surface portion 25 into sealing engagement with an input valve seat (elements 87, 89, 93, and 95, see FIGS. 11-13). When both the metering orifice 92 and the outlet orifice 53 are closed, a charge of pressurized gas is held within the pressurized chamber. When the outlet orifice 53 is opened by moving seal 36 away from output valve seat 51, and metering orifice 92 is closed, a discrete charge of gas is emitted from the regulator through orifice 53.

Poppet 18 carries o-ring seal 36 into sealing engagement with output valve seat 51 under the urging of pressure in the pressurized chamber that is defined by sub-chambers 90, 88, 82, 102, 86, and 84. The application of axially applied force to the distal end of poppet 18 causes o-ring seal 36 to move out of engagement with output valve seat 51. The bidirectional axial movement of poppet 18 is indicated by double headed arrow 56 (FIG. 2). This allows a discrete charge of gas within the pressurized chamber to flow out of the regulator 10 through outlet orifice 53 and into outlet port 100 (see particularly FIG. 2). As the pressure drops in the pressurized chamber the gas pressure on second surface portion 55 of piston member 22 drops, thus allowing piston spring 32 (together with the pressure in canister 12) to urge first surface portion 25 of sealing disk 24 out of sealing engagement with the input valve seat. This allows pressurized gas to flow through the metering orifice 92 as indicated by flow arrow 94, past the input valve seat, and into the pressurized chamber. The poppet spring 20 serves to hold the poppet 18 in operative association with output side retainer member 16. As pressurized gas enters the pressurized chamber it forces the o-ring seal 36 into sealing engagement with output valve seat 51. Pressure builds up in the pressurized chamber until the pressure on the second surface portion 55 exceeds the tension in piston spring 32 and the force of the gas pressure on first surface portion 25. This then forces the first surface portion 25 into sealing engagement with the input valve seat. Both the input and output sides of the pressurized chamber are thus sealed. The pressurized gas is held within the pressurized chamber until such time as the distal end of Poppet 18 is depressed to break the seal between o-ring seal 36 and output valve seat 51. Guide ring 54 is unitary with poppet 18 and acts with the generally cylindrical wall of outlet orifice 53 to align o-ring seal 36 with the output valve seat 51 to provide a reliable seal during every cycle of the regulator. Guide ring 54 also acts to retain the o-ring seal 36 in retainer groove 52. Generally cylindrical boss 108 serves to retain poppet spring 20 in the desired location relative to poppet 18. Annular shoulder 64 further confines one end of poppet spring 20 so that poppet 18 is held in the desired position relative to output side retainer member 16. The opposed end of poppet spring 20 rests against internal shoulder 62 at the bottom of a counterbore in piston member 22.

The pressurized chamber is defined by a series of sub-chambers. Input plenum 90 is within input side retainer member 34 and surrounds the components of the inlet valve. An annular passageway 88 is formed between the proximal end of piston strut 37 and generally cylindrical surface 104. Piston port 86 extends from this passageway into piston throat 84. Piston throat 84 extends generally axially within piston strut 37 to channel 82, which also extends generally axially within piston strut 37 to piston chamber 102, which is in the region of the distal end of piston member 22. Output side chamber 27 is formed in output side retainer member 16.

The pressurized chamber is separated from un-pressurized chamber 78 by o-ring seals 46 and 48, respectively. Un-pressurized chamber 78 is open to ambient atmospheric pressure by reason of vent port 138 (FIGS. 6 and 22). Vent port serves two purposes. The volume of the un-pressurized chamber 78 changes as piston member 22 slides within the cylinder defined by piston wall 106. Vent port accommodates these volume changes so that piston member 22 slides freely without being hindered by either a pressure build up or a pressure decrease. The cycle rate of regulator 10 is thus increased to as much as 40 cycles per second, more or less. In the event that gas pressure in the pressurized chamber exceeds some predetermined value, for example, 1,200 psi, the over pressurized gas blows by o-ring seal 48 and is vented to the ambient atmosphere through vent port 138. The outlet end of the vent port is positioned so that it discharges against the back of a pressure gage. This prevents a user from directly receiving the full force of the discharge of an over pressurized pressure chamber.

The output side retainer member 16 (FIGS. 2, 3, 4, 5, 14-16) includes generally cylindrical male threaded surface 58 that is adapted to threadably engage distal neck 13 of the unitary regulator body. Hex socket 144 is adapted to receive a conventional hex wrench. Outlet orifice 53 has an inlet end 41 surrounded by output valve seat 51 and outlet end 43 that in turn discharges into outlet port 100. A pressure relief groove 146 (FIG. 14) is provided running generally axially through cylindrical male threaded surface 58. This is a safety feature. If the output side retainer member 16 is unthreaded from the regulator while there is pressure within the pressurized chamber of the regulator, substantially all of the pressurized gas will vent through groove 146 before the output side retainer member 16 can be completely unthreaded from the regulator. Also, the presence of escaping gas will alert the operator that there is still gas under pressure within the regulator.

The input side retainer member 34 (FIGS. 2, 3, 9-13) includes a generally cylindrical male threaded surface 35 that is adapted to threadably engage proximal neck 15 of the unitary regulator body. Hex socket 142 is adapted to receive a conventional hex wrench. Generally cylindrical surface 104 is formed generally concentrically of the major axis of the regulator 10 and serves as a sealing surface when slidably engaged by o-ring seal 46 on the proximal end of piston strut 37. O-ring retainer groove 44 is adapted to retain o-ring seal 44 in operative sealing position on input side retainer member 34. Passageway 88 is sealed by o-ring seal 46. Metering orifice 92 meters gas flowing from canister 12 into regulator 10. Metering orifice 92 empties into input plenum 90. The volume of input plenum 90 changes depending upon the location of piston member 22 along its axial travel as indicated by a two-headed arrow at 98. Proximal end 29 of input side retainer member 34 may be positioned in certain embodiments within proximal neck 15, or in additional embodiments it may extend proximally beyond proximal end 28 into interior 38 of canister 12. Flare 101 (FIGS. 10 and 13) at the entrance to metering orifice 92 somewhat smoothes the flow of gas from canister 12 into metering orifice 92.

Input valve seat face 93 has a width 89 and terminates in input plenum 90 at edge 95. A generally straight cylindrical wall that defines metering orifice 92 extends to edge 95. Valve seat face 93 is surrounded by a generally conical surface 87 that extends at a shallow angle indicated at 99. Shallow angle 99 is generally from approximately 3 to 15 degrees. At angles that are smaller than approximately 3 degrees the first surface portion 25 does not reliably seal with input valve seat face 93. At angles greater than approximately 15 to 18 degrees the input valve flutters and does not reliably seal in the low pressure region below the nominal pressure at which the regulator is set to discharge gas charges. Flutter occurs when the first surface portion 25 bounces on the input valve seat face 93 instead of seating firmly. In certain embodiments shallow angle 99 extends at approximately 4 to 12 degrees, and in further embodiments shallow angle 99 extends at from approximately 5 to 10 degrees. Width 89 of input valve seat face 93 varies in various embodiments from approximately 0.003 to 0.025 inches, and in some embodiments from approximately 0.005 to 0.010 inches. The diameter 91 of the generally cylindrical metering orifice 92 may vary from approximately 0.030 to 0.125 inches, and in further embodiments from approximately 0.040 to 0.075 inches.

Piston member 22 includes a piston shank 37 that extends between a seal pocket 23 and an enlarged piston head 39. See particularly FIGS. 2, 3, 4, and 5. Force is applied by pressurized gas in the pressurized chamber on all of the distally facing surfaces of piston member 22. This aggregated distally facing surface area is represented at 55. The pressure exerted by the gas in canister 12 when the input valve is closed is confined to the area of the metering orifice 92. When this valve is open, the area exposed to the pressure in the canister is generally limited to the proximally facing surface 25 as permitted by the metering orifice. Annular gap 60 between enlarged piston head and piston wall 106 is sealed by o-ring seal 48. The various sub-chambers within or adjacent to piston member 22 that go to make up the pressurized chamber provide sufficient volume to accomplish the work that a charge of gas is expected to perform.

Regulator 10 includes a distal neck 13, a body 14, and a proximal neck 15, which are unitary with one another. See particularly FIGS. 2, 6, 7, 8, 20, 21, and 22. A longitudinal axis 17 (FIG. 8) forms the major axis of the regulator housing. Most of the components of regulator 10 are arrayed generally concentrically around longitudinal axis 17. Pressure release grooves 134 and 136 (FIGS. 6, 7, and 20) extend generally axially through male threads 96 on proximal neck 96. If an attempt is made to unscrew regulator 10 from a canister 12 while there is pressurized gas in the canister, the gas pressure will be relieved through pressure relief grooves 134 and 136 before the regulator can be fully unscrewed from the canister. A fill port 76 extends generally radially into body 14. A pressure gage port 140 likewise extends generally radially into body 14. A pressure rupture disk port 166 likewise extends generally radially into body 14. A fill channel 74 extends from fill port 76 to proximal end 28. From fill port 76 gage bore 160 (FIGS. 20-21) extends to pressure gage port 140, and pressure relief bore 162 extends to pressure rupture disk port 166. Fill channel 74 thus communicates between the interior 38 of canister 12 with all three ports in body 14 without intersecting with the specially configured bore that runs generally axially through the regulator 10. As indicated by double headed arrow 72, gas flows both ways through fill channel 74. During filling gas flows from fill port 76 through fill channel 74 into canister 12. In the event that the canister is overpressured and rupture disk 150 (FIG. 19) ruptures, gas will flow from canister 12 through fill channel 74, pressure relief bore 162, relief channel 152, and out relief ports 154.

A specially configured bore (FIGS. 2, 7, and 8) extends generally axially through regulator 10. Generally cylindrical wall 128 is adapted to sealingly engage o-ring seal 44. Female thread 132 is adapted to threadably engage with male thread 35 (FIGS. 9 and 11). Generally cylindrical wall 106 is adapted to sealingly engage with o-ring seal 48. Female thread 130 is adapted to threadably engage male thread 58 (FIGS. 14 and 16). An annular shoulder 70 defines a strut passage 80 therethrough, and a spring retainer boss 68. Piston spring 32 is retained between spring retainer boss 68 and spring retainer face 66 on piston member 22. The female threads in fill port 76 are adapted to threadably mate with a conventional filling attachment 120. Likewise, the female threads in pressure gage port 140 are adapted to mate with conventional gas pressure gage 118. Female threads in pressure rupture disk port 166 are adapted to mate with male threads 156 in a pressure rupture disk plug 148 (FIGS. 17, 18, and 19). A pressure rupture disk plug is marked (see FIG. 18) with the pressure at which rupture disk 150 will rupture. When a rupture occurs, overpressurized gas will flow through relief channel 152 and out relief ports 154. To avoid as much as possible the risk of exposing an operator to the overpressurized gas, relief ports 154 discharge laterally along body 14 rather than directly outwardly. Over pressure in the interior 38 of canister 12 thus causes rupture disk 150 to rupture without entering the pressurized chamber.

It can be seen that this process can occur at high speeds and, depending on the marker, the regulator 10 can provide compressed air to the marker that will allow the marker to expel as many as 40 paint balls per second.

Referring particularly to FIGS. 23 through 28, there is indicated generally at 168 a conventional pneumatic fill nipple. Fill nipple 168 includes generally arrayed along the major axis of fill nipple 168 between proximal and distal ends thereof, a conventional coupling portion 170 adjacent the proximal end, a conventional nut portion 172 medial the fill nipple, and an externally threaded barrel portion 174 adjacent the distal end. An axial bore 182 is generally cylindrical and extends generally concentrically with the major axis between the proximal and distal ends. Fill nipple 168 is adapted to be mounted to a regulator by threadable engagement with fill port 76.

Coupling portion 170 is designed to provide a quick-connect and disconnect function to allow convenient recharging of the gas supply in canister 12. A mating connector (not shown) slips over and releasably engages with coupling portion 170. Manual manipulation of the connector elements, without the use of any tools, is all that is required to connect or disconnect a source of gas to the regulator.

Nut portion 172 is adapted to be engaged by a conventional wrench for the purpose of threadably tightening or loosening a conventional threaded barrel 174 into fill port 76.

Fill nipple 176 provides the function of enabling the refilling of canister 12 through fill port 76, but has a much shorter profile than fill nipple 168. Fill nipple 176 includes coupling portion 170, and a barrel portion 178 that is externally threaded for engagement with internally threaded fill port 76. A collar 180 is positioned between barrel portion 178 and coupling portion 170.

Collar 180 serves as a stop for threaded engagement with fill port 76. Collar 180 prevents barrel portion 178 from being threadably advanced too far into fill port 76. Collar 180 also serves as a stop to prevent a mating connector from being inserted too far onto connector portion 170.

Connector portion 170 is the same in both fill nipples 168 and 176. This provides a functional connection with standard gas refilling systems.

Hex socket 184 in the proximal end of the axial bore of fill nipple 176 permits threadable rotation of fill nipple 176 by means of a conventional hex wrench inserted in hex socket 184. There is no nut portion in fill nipple 176. The axial length that is occupied by the nut portion 172 in fill nipple 168 has been eliminated and the overall axial length correspondingly reduced in fill nipple 176. According to an embodiment, collar 180 has an axial thickness of less than approximately 10, and in a further embodiment, less than approximately 7 percent of the length of the major axis of fill nipple 176. In a further embodiment, the axial thickness of collar 180 is approximately 5 percent of the length of the major axis of fill nipple 176. Barrel portion 178 is separated from coupling portion 170 only by the axial thickness of collar 180. This contributes significantly to the usability of a regulator to which fill nipple 176 is attached. The shorter profile of fill nipple 176 allows the user to more easily handle the system of which fill nipple 176 is a part. Safety is improved because there is less possibility of snagging clothing and equipment on the shorter fill nipple 176.

Coloring fill nipple 176 and the rest of the regulator and canister a dull black further enhances the quality of play by a user of paintball system that includes fill nipple 176 by making the system more difficult to see. It also reduces any possibility for glare or reflection off of the system that might impair the view of a player. Such coloring may be accomplished by way of conventional painting, anodizing, powder coating, or the like.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

The invention claimed is:

1. A regulator for regulating the delivery of pressurized gas from a supply of said pressurized gas to a device that utilizes discrete charges of pressure regulated gas comprising:

a regulator housing, said regulator housing having proximal and distal ends, said regulator housing having a specially configured bore extending therethrough, said regulator housing having a proximal portion adjacent said proximal end, a distal portion adjacent said distal end, and a body portion extending between said proximal and distal portions, said proximal portion adapted to being gas receivingly connected to said supply, and said distal portion adapted to being gas dischargingly connected to said device;

a metering orifice extending within said proximal portion from an inlet to an outlet, an input valve seat generally surrounding said outlet and generally facing towards said distal end, said specially configured bore including a piston receiving bore extending generally within said body portion, said metering orifice and input valve seat being entirely within said proximal portion, said input valve seat being surrounded by a generally conical surface having an angle of from approximately 4 to 15 degrees;

an output valve seat member removeably mounted in said distal portion, said output valve seat member having an outlet orifice extending therethrough between a first end and a second end, said second end opening to said distal end, an output valve seat generally surrounding said first end, said output valve seat generally facing toward said proximal end;

a poppet member mounted for movement in said outlet orifice between open and closed configurations, said poppet member being adapted to sealingly engage said output valve seat in said closed configuration; and a piston member mounted in sealing engagement with said piston receiving bore, said piston member being adapted to move between gas input, holding, and output configurations and to sealingly engage said input valve seat through a resilient seal in said gas holding and output configurations, said piston member being resiliently biased by a spring member toward said gas input configuration, said piston member sealingly defining pressurized and un-pressurized chambers within said regulator, said un-pressurized chamber generally surrounding a portion of said piston member and being open to an ambient atmospheric pressure, said pressurized chamber extending generally from said input valve seat to said output valve seat, a first surface portion of said piston member generally facing said proximal end and a second surface portion of said piston member generally facing said distal end, said first surface portion having a smaller surface area than said second surface portion, and both said first and second surface portions being within said pressurized chamber, whereby said larger surface area is adapted to allowing gas pressure within said pressurized chamber to overcome the resilient bias of said spring member and move said piston member to sealingly engage said input valve seat.

2. A regulator of claim 1 including a fill port in said body portion, and a fill channel extending in said regulator housing from said proximal end into said fill port without intersecting said specially configured bore.

3. A regulator of claim 1 wherein said body portion includes a fill port, a pressure gauge port, and a rupture disk port, a fill channel extending from said proximal end into said body portion through said proximal portion outwardly of said specially configured bore and into said fill port, said fill channel being connected to said pressure gauge port through a pressure gauge channel and to said rupture disk port through a rupture disk channel.

4. A regulator of claim 1 including a pressure gauge port and a pressure relief channel open to an ambient atmosphere and extending between said un-pressurized chamber and an exterior portion of said body portion, said exterior portion being adjacent said pressure gauge port.

5. A regulator of claim 1 wherein said metering orifice is generally cylindrical and said input valve seat comprises generally a frustum of a right cone generally concentric with said metering orifice and having an input valve seat face around said outlet.

6. A regulator of claim 1 wherein said proximal portion bears a male thread and said metering orifice and input valve seat are within an input valve seat member, said input valve seat member being entirely within said proximal portion.

7. A regulator of claim 1 wherein said regulator housing is all one piece, an axis extending longitudinally of said regulator housing between said proximal and distal ends, said specially configured bore extending generally concentrically of said axis, said specially configured bore including a first female thread adapted to threadably engaging an input side retainer member, a second female thread adapted to threadably engaging said output valve seat member, said piston receiving bore, and an annular boss extending inwardly from said piston receiving bore, said spring member being supported in said resiliently biased relation to said piston member by said annular boss.

8. A regulator of claim 2 including a fill nipple received in said fill port, said fill nipple having a coupling portion and a threaded barrel portion axially spaced apart by a collar along a major axis of said fill nipple, said collar having an axial thickness of less than approximately 10 percent of said major axis.

9. A regulator of claim 1 wherein said regulator is colored a dull black.

10. A regulator of claim 1 including a fill nipple received in a fill port, said fill nipple having a coupling portion and a threaded barrel portion axially spaced apart by a collar along a major axis of said fill nipple, said collar having an axial thickness of less than approximately 10 percent of said major axis, said fill nipple including an axial bore extending generally concentric with said major axis between proximal and distal ends of said fill nipple, and a hex socket in said axial bore at said proximal end.

11. A regulator adapted to regulating the delivery of discrete charges of pressurized gas from a supply of said pressurized gas contained in a canister that includes a canister neck comprising:
a regulator housing, said regulator housing having proximal and distal ends, and a specially configured bore extending between said proximal and distal ends, said regulator housing having a proximal portion adjacent said proximal end, a distal portion adjacent said distal end, and a body portion extending between said proximal and distal portions, said proximal portion adapted to being received substantially entirely within said canister neck, and said distal portion adapted to being gas dischargingly connected to a device that utilizes said discrete charges of pressurized gas;
said proximal portion having an input side retainer member removably mounted therein, said input side retainer member including a metering orifice having an inlet end, an outlet end, and an input valve seat generally surrounding said outlet end, said input valve seat generally facing towards said distal end, said input valve seat being entirely within said proximal portion;
a piston member mounted in said specifically configured bore, said piston member being adapted to move between gas input, gas holding, and gas output configurations and to sealingly engage said input valve seat through a resilient seal in said gas holding and gas output configurations and to disengage from said input valve seat in said gas input configuration, said piston member being resiliently biased toward said gas input configuration, said piston member being adapted to move against said resilient bias to said gas holding configuration responsive to a build up of pressure to a predetermined amount within a pressurized chamber within said specially configured bore.

12. A regulator of claim 11 wherein said regulator housing is one piece.

13. A regulator of claim 11 including an output side retainer member with a generally cylindrical male threaded surface having an axial length and adapted to being threadably mounted in said distal portion, and a pressure relief groove running generally axially through said generally cylindrical male threaded surface for a part of said axial length.

14. A regulator adapted to regulating the delivery of discrete charges of pressurized gas from a supply of said pressurized gas contained in a canister that includes a canister neck, said regulator comprising:
a body, said body being one piece and having a proximal end, a distal end, and a longitudinal axis extending therethrough, said body having a proximal portion adjacent said proximal end, a distal portion adjacent said distal end, and a body portion extending between said proximal and distal portions, said body including a bore extending generally concentric of said longitudinal axis between said proximal and distal ends, said bore being specially configured;
an input side retainer member having a metering orifice therein and an input valve seat, said input side retainer member adapted to being removably mounted in said proximal portion;
an output side retainer member including an outlet orifice, said output side retainer member adapted to being removably mounted in said distal portion;
a poppet member adapted to being valvingly associated with said outlet orifice and adapted to being actuated to a gas output configuration by an operator; and,
a piston member adapted to being mounted in said bore, said piston member being adapted to move between gas input, gas holding, and said gas output configurations and to sealingly engage said input valve seat through a resilient seal in said gas holding and gas output configurations and to disengage from said input valve seat in said gas input configuration, said piston member adapted to being resiliently biased toward said gas input configuration, said piston member being adapted to move against said resilient bias to said gas holding configuration responsive to a build up of pressure to a predetermined amount in a pressurized chamber in said bore, said pressurized chamber being adapted to holding a said discrete charge of pressurized gas at said predetermined amount of pressure until said poppet member is actuated to said gas output configuration, said piston, input retainer, and output retainer members adapted to being generally aligned with one another along said longitudinal axis.

15. A regulator of claim 14 wherein said proximal portion is adapted to being received substantially entirely within said canister neck.

16. A regulator of claim 14 wherein said output side retainer member includes a wrench receiving socket adapted to being generally aligned with said longitudinal axis.

17. A regulator of claim 14 including a fill port in said body and a fill nipple adapted to being threadably received in said fill port, said fill nipple having a coupling portion and a threaded barrel portion axially spaced apart by a collar along a major axis of said fill nipple, said collar having an axial thickness of less than approximately 10 percent of said major axis.

18. A regulator of claim 14 wherein said proximal and distal portions are internally threaded, and said input side retainer member is adapted to being threadably mounted in said proximal portion, and said output side retainer member is adapted to being threadably mounted in said distal portion.

19. A regulator of claim 18 wherein said output side retainer member includes a male thread and a pressure relief groove running generally axially in said male thread.

20. A regulator adapted to regulating the delivery of discrete charges of pressurized gas from a supply of said pressurized gas contained in a canister that includes a canister neck, said regulator comprising:
 a body having a proximal end, a distal end, and a longitudinal axis extending therethrough, said body having a proximal portion adjacent said proximal end, a distal portion adjacent said distal end, and a body portion extending between said proximal and distal portions, said proximal portion adapted to being received substantially entirely within said canister neck, said body including a bore extending generally concentric of said longitudinal axis between said proximal and distal ends, said bore being specially configured, said proximal and distal portions being internally threaded;
 an input side retainer member having a metering orifice therein and an input valve seat, said input side retainer member being threadably mounted in said proximal portion;
 an output side retainer member including an outlet orifice, said output side retainer member being threadably mounted in said distal portion;
 a poppet member valvingly associated with said outlet orifice and adapted to being actuated to a gas output configuration by an operator; and,
 a piston member mounted in said bore, said piston member being adapted to move between gas input, gas holding, and said gas output configurations and to sealingly engage said input valve seat through a resilient seal in said gas holding and gas output configurations and to disengage from said input valve seat in said gas input configuration, said piston member being resiliently biased toward said gas input configuration, said piston member being adapted to move against said resilient bias to said gas holding configuration responsive to a build up of pressure to a predetermined amount in a pressurized chamber in said bore, said pressurized chamber being adapted to holding a said discrete charge of pressurized gas at said predetermined amount of pressure until said poppet member is actuated to said gas output configuration, said piston, input retainer, and output retainer members being generally aligned with one another along said longitudinal axis.

21. A method of assembling a regulator that is adapted to regulating the delivery of discrete charges of pressurized gas comprising:
 selecting a body having a proximal end, a distal end, and a longitudinal axis extending therethrough, said body having a proximal portion adjacent said proximal end, a distal portion adjacent said distal end, and a body portion extending between said proximal and distal portions, said body including a bore extending generally concentric of said longitudinal axis between said proximal and distal ends, said bore being specially configured;
 selecting an input side retainer member having a metering orifice of a desired size therein; and
 removably installing said input side retainer member in said proximal portion;
 wherein said bore includes an internally threaded proximal portion and an internally threaded distal portion, and said method includes installing an output side retainer member in said internally threaded distal portion by engaging a socket in said output retainer member with a tool.

\* \* \* \* \*